No. 622,697. Patented Apr. 11, 1899.
G. LEWIS.
CAR BRAKE.
(Application filed June 18, 1898.)

(No Model.)

WITNESSES
John Buckler,
M. O. Knowles

INVENTOR
George Lewis
BY
Edgar Tate & Co.
ATTORNEYS

UNITED STATES PATENT OFFICE.

GEORGE LEWIS, OF DENBIGH, ENGLAND.

CAR-BRAKE.

SPECIFICATION forming part of Letters Patent No. 622,697, dated April 11, 1899.

Application filed June 18, 1898. Serial No. 683,889. (No model.)

*To all whom it may concern:*

Be it known that I, GEORGE LEWIS, a subject of the Queen of Great Britain, residing at Denbigh, in the county of Denbigh, England, have invented certain new and useful Improvements in Car-Brakes, of which the following is a full and complete specification, such as will enable those skilled in the art to which it appertains to make and use the same.

This invention relates to car-brakes which are particularly adapted to the use of railroad-trains; and the object is to provide a brake for a train of cars which can be set by the engineer in the cab or by a brakeman in any part of the train.

The invention consists of a brake for a train of cars constructed substantially as hereinafter described, and defined in the claims.

The invention is fully disclosed in the following specification, of which the accompanying drawings form a part, in which the separate parts of my improvement are designated by the same letters of reference in each of the views, and in which—

Figure 1:
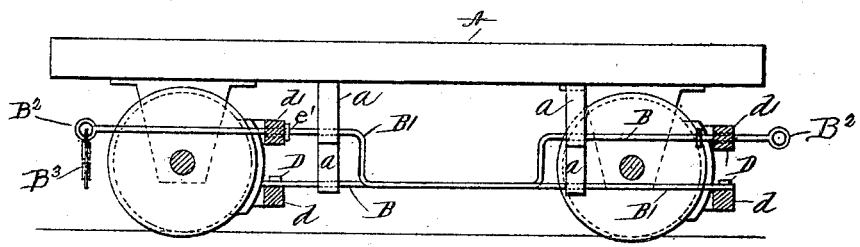
Figure 2:
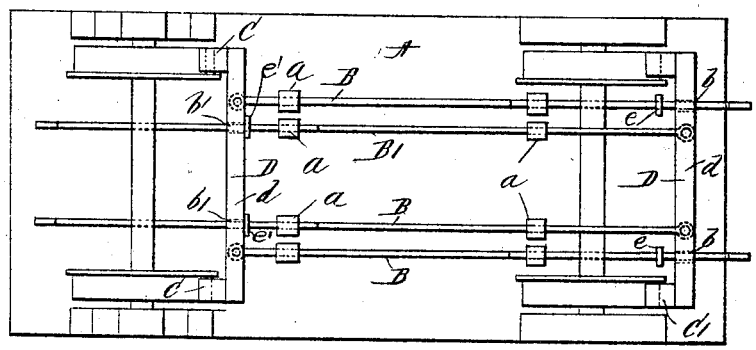

Figure 1 is a side view of a car equipped with a brake constructed in accordance with this invention, and Fig. 2 is a plan view of the under side of the car.

Referring to the drawings, A represents a car of any ordinary or preferred form, from the under side of which depend a series of hangers $a$, provided with an opening in their lower ends. These hangers are arranged in pairs adjacent to the front and rear trucks. These hangers $a$ are adapted to support brake-rods B B', which are adapted to slide longitudinally through the perforations in said hangers.

To the forward end of the brake-rod B is fixed the brake-beam D, which is provided with a lower beam $d$ and an upper beam $d'$, which are suitably secured together and are provided with any usual or preferred form of brake-shoe C.

The rear portion of the brake-rod B is bent upwardly and then horizontally and passed through an opening $b$, formed through the upper beam $d'$ of the rear brake-beam D. The rods B and B' are similarly but oppositely arranged, the rod B being connected with the lower beam $d$ of the rear brake-beam D and the forward portion bent upwardly and forwardly and passing through the openings $b'$ of the upper beam $d'$ of the forward brake-beam D.

The brake-rods B are provided with a stop-flange $e\,e$, arranged thereon a short distance in front of the beam $d'$ and which is adapted to engage the side of the beam $d'$ to release the brake from the rear truck.

The brake-rods B' are provided with similar stops $e'\,e'$, which operate to engage the upper beam $d'$ of the front brake-beam D to apply the brake to the front truck.

The outer extremities of the brake-rods B B, which may be provided with eyes $B^2$, are provided with suitable means, such as hooked chains $B^3$, for engaging said eyes, by which the brake-rods of one car may be coupled and uncoupled with the brake-rods of another and the whole series be connected with operating means at one end of the train to set the brakes and at the other end to release the brakes. Brake-operating devices may also be interspersed throughout the train for one or more cars, as desired.

It is evident that the operation of the rods B will move the rods B' also, and vice versa. This is due to the stops on each rod arranged in proximity to the openings in the upper brake-beam through which the said rods pass, the upper and lower brake-beams being connected, as described. It follows that if the upper ends of the rods B and B', respectively, are connected in a single chain throughout the train the setting of the brakes at one end of the train and the releasing of the brakes at the other will affect the brakes on all the cars similarly.

It will be readily understood from the above description that power applied to the rods B will release the brakes and that power applied to the rods B' will apply the brakes.

Any ordinary or preferred means may be employed for setting and releasing the brakes; but it has been considered unnecessary to illustrate any particular means for this purpose.

Having fully described my invention, I claim as new and desire to secure by Letters Patent—

1. The combination with the frame of a car, of a front and rear brake-beam, each consisting of an upper and a lower beam, a suitable brake-shoe secured to said upper and lower beams, rods fixed to the lower front brake-beam and adapted to engage the upper rear brake-beam, and rods fixed to the lower rear brake-beam and adapted to engage the upper front brake-beam, substantially as described.

2. The combination with the frame of a car, of a front and rear brake-beam each consisting of an upper and a lower beam, a suitable brake-shoe secured to said upper and lower beams, rods fixed to the lower beam of the front brake-beam, the other end of said rods passing through openings in the upper beam of the rear brake-beam, rods fixed to the lower beam of the rear brake-beam, the other end of said rods passing through openings in the upper beam of the front brake-beam, said rods being provided with stops adapted to engage the beams provided with said openings, and means whereby the rods of one car may be coupled or uncoupled with the rods of another car, substantially as described.

In testimony that I claim the foregoing as my invention I have signed my name, in presence of the subscribing witnesses, this 28th day of March, 1898.

GEORGE LEWIS.

Witnesses:
J. WILSON PARRY,
JAMES GREEN.